US010728926B2

(12) United States Patent
Lee et al.

(10) Patent No.: US 10,728,926 B2
(45) Date of Patent: Jul. 28, 2020

(54) METHOD AND APPARATUS FOR REALLOCATING PUCCH RESOURCE ACCORDING TO CHANGE OF SPS OPERATION IN WIRELESS COMMUNICATION SYSTEM

(71) Applicant: LG ELECTRONICS INC., Seoul (KR)

(72) Inventors: Youngdae Lee, Seoul (KR); Hanbyul Seo, Seoul (KR); Myoungseob Kim, Seoul (KR); Seungmin Lee, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/097,774

(22) PCT Filed: May 2, 2017

(86) PCT No.: PCT/KR2017/004632
§ 371 (c)(1),
(2) Date: Oct. 30, 2018

(87) PCT Pub. No.: WO2017/191963
PCT Pub. Date: Nov. 9, 2017

(65) Prior Publication Data

US 2019/0174533 A1 Jun. 6, 2019

Related U.S. Application Data

(60) Provisional application No. 62/330,255, filed on May 2, 2016.

(51) Int. Cl.
*H04W 72/14* (2009.01)
*H04W 72/04* (2009.01)
(Continued)

(52) U.S. Cl.
CPC .......... *H04W 72/14* (2013.01); *H04L 1/1819* (2013.01); *H04L 1/1887* (2013.01);
(Continued)

(58) Field of Classification Search
None
See application file for complete search history.

(56) References Cited

U.S. PATENT DOCUMENTS

| 8,706,129 B2 * | 4/2014 | Wu ...................... H04W 72/02 370/329 |
| 2012/0069805 A1 * | 3/2012 | Feuersanger ..... H04W 72/1284 370/329 |

(Continued)

FOREIGN PATENT DOCUMENTS

| KR | 1020130135275 | 12/2013 |
| WO | 2013027967 | 2/2013 |

OTHER PUBLICATIONS

PCT International Application No. PCT/KR2017/004632, International Search Report dated May 2, 2017, 4 pages.
(Continued)

*Primary Examiner* — Jay P Patel
(74) *Attorney, Agent, or Firm* — Lee, Hong, Degerman, Kang & Waimey

(57) ABSTRACT

A user equipment (UE) receives, from a network, a semi-persistent scheduling (SPS) configuration and a physical uplink control channel (PUCCH) resource configuration. The PUCCH resource configuration may be included in the SPS configuration. When a change of an SPS operation is required, the user equipment transmits an SPS change request to the network and receives, from the network, an SPS resource grant activated according to the SPS change request. The user equipment changes allocation of a PUCCH resource allocated according to the PUCCH resource configuration, on the basis of the received SPS resource grant.
(Continued)

For example, a timing at which or a period in which the PUCCH resource is allocated can be changed.

12 Claims, 8 Drawing Sheets

(51) Int. Cl.
  *H04W 76/11* (2018.01)
  *H04W 4/40* (2018.01)
  *H04W 76/27* (2018.01)
  *H04L 1/18* (2006.01)
  *H04L 5/00* (2006.01)
  *H04W 28/02* (2009.01)
  *H04W 68/02* (2009.01)
  *H04W 80/02* (2009.01)
  *H04W 72/12* (2009.01)

(52) U.S. Cl.
  CPC .......... *H04L 5/0055* (2013.01); *H04W 4/40* (2018.02); *H04W 28/0278* (2013.01); *H04W 68/02* (2013.01); *H04W 72/042* (2013.01); *H04W 72/0406* (2013.01); *H04W 76/11* (2018.02); *H04W 76/27* (2018.02); *H04W 80/02* (2013.01); *H04W 72/1284* (2013.01)

(56) References Cited

U.S. PATENT DOCUMENTS

| | | | | |
|---|---|---|---|---|
| 2012/0147838 | A1* | 6/2012 | Qin | H04L 5/001 370/329 |
| 2013/0210422 | A1* | 8/2013 | Pani | H04W 48/16 455/423 |
| 2013/0242923 | A1 | 9/2013 | Yang et al. | |
| 2014/0003379 | A1* | 1/2014 | Kang | H04L 5/0053 370/329 |
| 2015/0173048 | A1* | 6/2015 | Seo | H04W 72/1247 370/329 |
| 2015/0215944 | A1* | 7/2015 | Kim | H04L 5/001 370/329 |
| 2015/0223212 | A1* | 8/2015 | Der Velde | H04L 5/0032 370/329 |
| 2015/0372798 | A1* | 12/2015 | Zhao | H04L 5/14 370/280 |
| 2017/0019914 | A1* | 1/2017 | Rune | H04W 72/1284 |
| 2017/0289733 | A1* | 10/2017 | Rajagopal | H04W 4/70 |
| 2019/0014563 | A1* | 1/2019 | Lee | H04W 72/10 |
| 2019/0045507 | A1 | 2/2019 | Sorrentino et al. | |
| 2019/0116609 | A1 | 4/2019 | Feng et al. | |

OTHER PUBLICATIONS

Oppo, "Discussion on the SPS configuration", R1-162340, 3GPP TSG RAN WG1 Meeting #84 bis, Apr. 2016, 2 pages.

Panasonic, "Signalling design to support SPS activation/release in V2V", R1-162533, 3GPP TSG RAN WG1 Meeting #84bis, Apr. 2016.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13); Section 11.1.1-11.1.2 of 3GPP TS 36.300 V13.2.0, Dec. 2015, 4 pages.

3rd Generation Partnership Project; Technical Specification Group Radio Access Network; Evolved Universal Terrestrial Radio Access (E-UTRA); Medium Access Control (MAC) protocol specification (Release 13); Section 5.10 of 3GPP TS 36.321 V13.0.0, Dec. 2015, 4 pages.

United States Patent and Trademark Office U.S. Appl. No. 16/098,304, Office Action dated Dec. 12, 2019, 14 pages.

* cited by examiner

METHOD AND APPARATUS FOR REALLOCATING PUCCH RESOURCE ACCORDING TO CHANGE OF SPS OPERATION IN WIRELESS COMMUNICATION SYSTEM

CROSS-REFERENCE TO RELATED APPLICATIONS

This application is the National Stage filing under 35 U.S.C. 371 of International Application No. PCT/KR2017/004632, filed on May 2, 2017, which claims the benefit of U.S. Provisional Application No. 62/330,255, filed on May 2, 2016, the contents of which are all hereby incorporated by reference herein in their entirety.

BACKGROUND OF THE INVENTION

Field of the Invention

The present invention relates to wireless communications, and, more particularly, to a method and apparatus for reallocating a physical uplink control channel (PUCCH) resource according to change of semi-persistent scheduling (SPS) operation triggered by a user equipment (UE) in wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

LTE-based vehicle-to-everything (V2X) is urgently desired from market requirement as widely deployed LTE-based network provides the opportunity for the vehicle industry to realize the concept of 'connected cars'. The market for vehicle-to-vehicle (V2V) communication in particular is time sensitive because related activities such as research projects, field test, and regulatory work are already ongoing or expected to start in some countries or regions such as US, Europe, Japan, Korea, and China.

Semi-persistent (SPS) is a function for considerably reducing a control channel overhead of an application which requires consistent wireless resource allocation, such as voice over Internet protocol (VoIP). If the SPS is not given, every downlink (DL) or uplink (UL) physical resource block (PRB) allocation needs to be permitted through an access grant message on a physical downlink control channel (PDCCH). This is sufficient for most of bursty best effort type applications having a big packet size, and thus, only a few users are usually scheduled in each subframe. However, in the case of an application which requires consistent allocation of a small packet (e.g. VoIP), an access grant overhead of a control channel may be greatly reduced by the SPS. That is, the SPS introduces permanent RPB allocation which is expected by a user from the DL or which can be transmitted from the UL. There are various methods in which the SPS is able to set consistent allocation.

Since a message has a relatively small size and is periodically transmitted in V2X communication, a method for transmitting a V2X message through a resource allocated by the SPS is being discussed.

SUMMARY OF THE INVENTION

The present invention provides a method and apparatus for reallocating a physical uplink control channel (PUCCH) resource according to change of semi-persistent scheduling (SPS) operation triggered by a user equipment (UE) in a wireless communication system.

In an aspect, a method for performing a semi-persistent scheduling (SPS) operation by a user equipment (UE) in a wireless communication system is provided. The method includes receiving an SPS configuration and a physical uplink control channel (PUCCH) resource configuration from a network, transmitting an SPS change request to the network, receiving an SPS resource grant activated based on the SPS change request from the network, and changing allocation of a PUCCH resource, which has been allocated by the PUCCH resource configuration, based on the received SPS resource grant.

In another aspect, a user equipment (UE) in a wireless communication system is provided. The UE includes a memory, a transceiver, and a processor, operably coupled to the memory and the transceiver, that controls the transceiver to receive an SPS configuration and a physical uplink control channel (PUCCH) resource configuration from a network, controls the transceiver to transmit an SPS change request to the network, controls the transceiver to receive an SPS resource grant activated based on the SPS change request from the network, and changes allocation of a PUCCH resource, which has been allocated by the PUCCH resource configuration, based on the received SPS resource grant.

If an SPS resource is reallocated according to change of an SPS operation triggered by a UE, a PUCCH resource can be reallocated accordingly.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
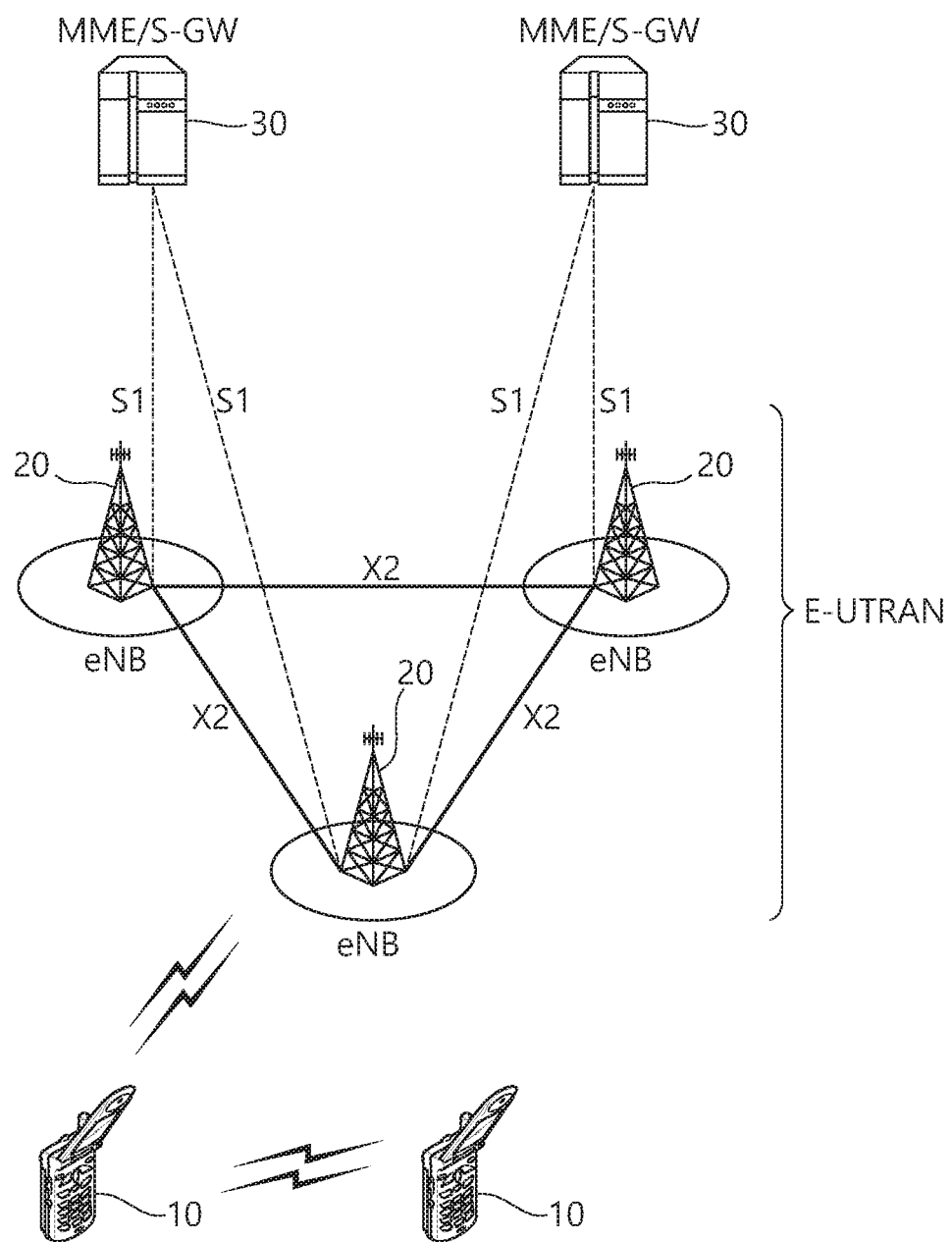
FIG. 1 shows LTE system architecture.

FIG. 1 shows LTE system architecture. Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10. An uplink (UL) denotes communication from the UE 10 to the eNB 20. A sidelink (SL) denotes communication between the UEs 10. In the DL, a transmitter may be a part of the eNB 20, and a receiver may be a part of the UE 10. In the UL, the transmitter may be a part of the UE 10, and the receiver may be a part of the eNB 20. In the SL, the transmitter and receiver may be a part of the UE 10.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The UEs 10 are connected to each other via a PC5 interface. The eNBs 20 are connected to each other via an X2 interface. Neighboring eNBs may have a meshed network structure that has the X2 interface. The eNB 20 is connected to the gateway 30 via an S1 interface.

Figure 2:
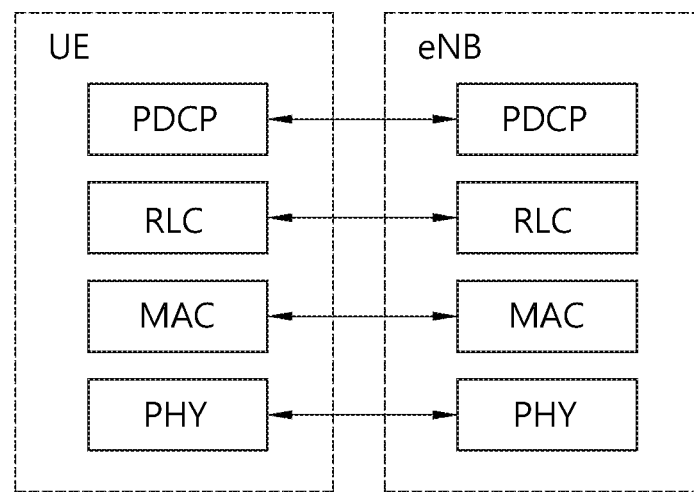
FIG. 2 shows a block diagram of a user plane protocol stack of an LTE system.
Figure 3:
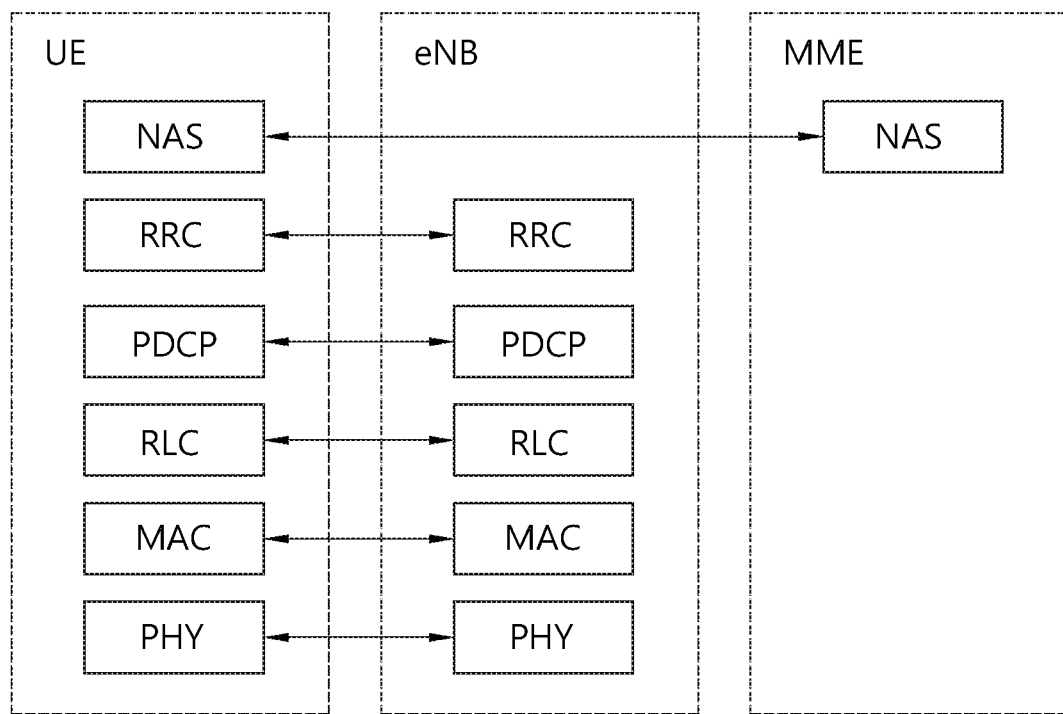
FIG. 3 shows a block diagram of a control plane protocol stack of an LTE system.

FIG. 2 shows a block diagram of a user plane protocol stack of an LTE system. FIG. 3 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 2, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 3, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE IDLE mobility handling, paging origination in LTE IDLE, and security control for the signaling between the gateway and UE.

A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, and an uplink shared channel (UL-SCH) for transmitting user traffic or control signals. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both UL and DL. The MTCH is a point-to-multipoint downlink channel for transmitting traffic data from the network to the UE.

UL connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Sidelink is described. Sidelink is a UE to UE interface for sidelink communication and sidelink discovery. The Sidelink corresponds to the PC5 interface. Sidelink communication is AS functionality enabling ProSe direct communication, between two or more nearby UEs, using E-UTRA technology but not traversing any network node. Sidelink discovery is AS functionality enabling ProSe direct discovery, using E-UTRA technology but not traversing any network node. Sidelink uses UL resources and physical channel structure similar to UL transmissions. Sidelink transmission uses the same basic transmission scheme as the UL transmission scheme. However, sidelink is limited to single cluster transmissions for all the sidelink physical channels. Further, sidelink uses a 1 symbol gap at the end of each sidelink subframe.

Sidelink communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform sidelink communication.

In order to perform synchronization for out of coverage operation, UE(s) may act as a synchronization source by transmitting SBCCH and a synchronization signal. SBCCH carries the most essential system information needed to receive other sidelink channels and signals. SBCCH along with a synchronization signal is transmitted with a fixed periodicity of 40 ms. When the UE is in network coverage, the contents of SBCCH are derived from the parameters signaled by the eNB. When the UE is out of coverage, if the UE selects another UE as a synchronization reference, then the content of SBCCH is derived from the received SBCCH. Otherwise, UE uses pre-configured parameters. System information block type-18 (SIB18) provides the resource information for synchronization signal and SBCCH transmission. There are two pre-configured subframes every 40 ms for out of coverage operation. UE receives synchronization signal and SBCCH in one subframe and transmit synchronization signal and SBCCH on another subframe if UE becomes synchronization source based on defined criterion.

UE performs sidelink communication on subframes defined over the duration of sidelink control period. The sidelink control period is the period over which resources allocated in a cell for sidelink control information and sidelink data transmissions occur. Within the sidelink control period, the UE sends sidelink control information followed by sidelink data. Sidelink control information indicates a Layer 1 ID and characteristics of the transmissions (e.g. MCS, location of the resource(s) over the duration of sidelink control period, timing alignment).

The UE performs transmission and reception over Uu and PC5 with the following decreasing priority order:
  Uu transmission/reception (highest priority);
  PC5 sidelink communication transmission/reception;
  PC5 sidelink discovery announcement/monitoring (lowest priority).

The UE supporting sidelink communication can operate in two modes for resource allocation. The first mode is a scheduled resource allocation. The scheduled resource allocation may be referred to as Mode 1. In Mode 1, the UE needs to be RRC_CONNECTED in order to transmit data. The UE requests transmission resources from the eNB. The eNB schedules transmission resources for transmission of sidelink control information and data. The UE sends a scheduling request (dedicated scheduling request (D-SR) or random access) to the eNB followed by a sidelink buffer status report (BSR). Based on the sidelink BSR, the eNB can determine that the UE has data for a sidelink communication transmission and estimate the resources needed for transmission. The eNB can schedule transmission resources for sidelink communication using configured sidelink radio network temporary identity (SL-RNTI).

The second mode is a UE autonomous resource selection. The UE autonomous resource selection may be referred to as Mode 2. In Mode 2, a UE on its own selects resources from resource pools and performs transport format selection to transmit sidelink control information and data. There can be up to 8 transmission pools either pre-configured for out of coverage operation or provided by RRC signalling for in-coverage operation. Each pool can have one or more ProSe per-packet-priority (PPPP) associated with it. For transmission of a MAC protocol data unit (PDU), UE selects a transmission pool in which one of the associated PPPP is equal to the PPPP of a logical channel with highest PPPP among the logical channel identified in the MAC PDU. There is one to one association between sidelink control pool and sidelink data pool. Once the resource pool is selected, the selection is valid for the entire sidelink control period. After the sidelink control period is finished, the UE may perform resource pool selection again.

A set of transmission and reception resource pools for sidelink control information when the UE is out of coverage for sidelink communication is pre-configured in the UE. The resource pools for sidelink control information when the UE is in coverage for sidelink communication are configured as below. The resource pools used for reception are configured by the eNB via RRC, in broadcast signaling. The resource pool used for transmission is configured by the eNB via RRC, in dedicated or broadcast signaling, if Mode 2 is used, and the resource pool used for transmission is configured by the eNB via RRC, in dedicated signaling if Mode 1 is used. The eNB schedules the specific resource(s) for sidelink control information transmission within the configured reception pools.

A set of transmission and reception resource pools for data when the UE is out of coverage for sidelink communication is pre-configured in the UE. The resource pools for data when the UE is in coverage for sidelink communication are configured as below. The resource pools used for transmission and reception are configured by the eNB via RRC, in dedicated or broadcast signaling, if Mode 2 is used. There is no resource pool for transmission and reception if Mode 1 is used.

Sidelink discovery is defined as the procedure used by the UE supporting sidelink discovery to discover other UE(s) in its proximity, using E-UTRA direct radio signals via PC5. Sidelink discovery is supported both when UE is served by EUTRAN and when UE is out of EUTRA coverage. Only ProSe-enabled public safety UE can perform sidelink discovery when it is out of EUTRA coverage. For public safety sidelink discovery, the allowed frequency is pre-configured in the UE, and is used even when UE is out of coverage of EUTRA in that frequency. The pre-configured frequency is the same frequency as the public safety ProSe carrier.

In order to perform synchronization, UE(s) participating in announcing of discovery messages may act as a synchronization source by transmitting a synchronization signal based on the resource information for synchronization signals provided in SIB19.

There are two types of resource allocation for discovery message announcement. The first type is UE autonomous resource selection which is a resource allocation procedure where resources for announcing of discovery message are allocated on a non UE specific basis. The UE autonomous resource selection may be referred to as Type 1. In Type 1, the eNB provides the UE(s) with the resource pool configuration used for announcing of discovery message. The configuration may be signaled in broadcast or dedicated signaling. The UE autonomously selects radio resource(s) from the indicated resource pool and announces discovery message. The UE can announce discovery message on a randomly selected discovery resource during each discovery period.

The second type is scheduled resource allocation which is a resource allocation procedure where resources for announcing of discovery message are allocated on per UE specific basis. The scheduled resource allocation may be referred to as Type 2. In Type 2, the UE in RRC_CONNECTED may request resource(s) for announcing of discovery message from the eNB via RRC. The eNB assigns resource(s) via RRC. The resources are allocated within the resource pool that is configured in UEs for announcement.

For UEs in RRC_IDLE, the eNB may select one of the following options. The eNB may provide a resource pool for UE autonomous resource selection based discovery message announcement in SIB19. UEs that are authorized for sidelink discovery use these resources for announcing discovery message in RRC_IDLE. Or, the eNB may indicate in SIB19 that it supports sidelink discovery but does not provide resources for discovery message announcement. UEs need to enter RRC_CONNECTED in order to request resources for discovery message announcement.

For UEs in RRC_CONNECTED, a UE authorized to perform sidelink discovery announcement indicates to the eNB that it wants to perform sidelink discovery announcement. UE can also indicate to the eNB, the frequency(s) in which sidelink discovery announcement is desired. The eNB validates whether the UE is authorized for sidelink discovery announcement using the UE context received from MME. The eNB may configure the UE with resource pool for UE autonomous resource selection for discovery message announcement via dedicated signaling. The eNB may configure resource pool along with dedicated resource in the form of time and frequency indices for discovery message announcement via dedicated RRC signaling. The resources allocated by the eNB via dedicated signaling are valid until the eNB re-configures the resource(s) by RRC signaling or the UE enters RRC_IDLE.

Authorized receiving UEs in RRC_IDLE and RRC_CONNECTED monitor resource pools used for UE autonomous resource selection and resource pools for scheduled resource allocation. The eNB provides the resource pool configuration used for discovery message monitoring on intra frequency, inter frequency of same or different PLMNs cells in RRC signaling (SIB19 or dedicated). The RRC signaling (SIB19 or dedicated) may contain detailed sidelink discovery configuration used for announcement of sidelink discovering in cells of intra-frequency, inter-frequency of same or different PLMNs.

Semi-persistent scheduling (SPS) is described. It may be referred to as 3GPP TS 36.300 V13.2.0 (2015 December) Section 11.1.1, 11.1.2 and 3GPP TS 36.321 V13.0.0 (2015 December) Section 5.10. E-UTRAN can allocate semi-persistent DL resources for the first HARQ transmissions to UEs. RRC defines the periodicity of the semi-persistent DL grant. PDCCH indicates whether the DL grant is a semi-persistent one, i.e. whether it can be implicitly reused in the following TTIs according to the periodicity defined by RRC.

When required, retransmissions are explicitly signaled via the PDCCH(s). In the subframes where the UE has semi-persistent DL resource, if the UE cannot find its cell radio network temporary identity (C-RNTI) on the PDCCH(s), a DL transmission according to the semi-persistent allocation that the UE has been assigned in the TTI is assumed. Otherwise, in the subframes where the UE has semi-persistent DL resource, if the UE finds its C-RNTI on the PDCCH(s), the PDCCH allocation overrides the semi-persistent allocation for that TTI and the UE does not decode the semi-persistent resources.

When carrier aggregation (CA) is configured, semi-persistent DL resources can only be configured for the primary cell (PCell) and only PDCCH allocations for the PCell can override the semi-persistent allocation. When dual connectivity (DC) is configured, semi-persistent DL resources can only be configured for the PCell or primary secondary cell (PSCell). Only PDCCH allocations for the PCell can override the semi-persistent allocation for PCell and only PDCCH allocations for the PSCell can override the semi-persistent allocation for PSCell.

In addition, E-UTRAN can allocate a semi-persistent UL resource for the first HARQ transmissions and potentially retransmissions to UEs. RRC defines the periodicity of the semi-persistent UL grant. PDCCH indicates whether the UL grant is a semi-persistent one, i.e. whether it can be implicitly reused in the following TTIs according to the periodicity defined by RRC.

In the subframes where the UE has semi-persistent UL resource, if the UE cannot find its C-RNTI on the PDCCH(s), a UL transmission according to the semi-persistent allocation that the UE has been assigned in the TTI can be made. The network performs decoding of the pre-defined PRBs according to the pre-defined MCS. Otherwise, in the subframes where the UE has semi-persistent UL resource, if the UE finds its C-RNTI on the PDCCH(s), the PDCCH allocation overrides the persistent allocation for that TTI and the UE's transmission follows the PDCCH allocation, not the semi-persistent allocation. Retransmissions are either implicitly allocated in which case the UE uses the semi-persistent UL allocation, or explicitly allocated via PDCCH(s) in which case the UE does not follow the semi-persistent allocation.

Similarly as for the DL, semi-persistent UL resources can only be configured for the PCell and only PDCCH allocations for the PCell can override the semi-persistent allocation. When DC is configured, semi-persistent UL resources can only be configured for the PCell or PSCell. Only PDCCH allocations for the PCell can override the semi-persistent allocation for PCell and only PDCCH allocations for the PSCell can override the semi-persistent allocation for PSCell.

When SPS is enabled by RRC, the following information is provided:
  SPS C-RNTI;
  UL SPS interval semiPersistSchedIntervalUL and number of empty transmissions before implicit release implicitReleaseAfter, if SPS is enabled for the UL;
  Whether twoIntervalsConfig is enabled or disabled for UL, only for time division duplex (TDD);
  DL SPS interval semiPersistSchedIntervalDL and number of configured HARQ processes for SPS numberOfConjSPS-Processes, if SPS is enabled for the DL;

When SPS for UL or DL is disabled by RRC, the corresponding configured grant or configured assignment shall be discarded.

The above information may be carried in SPS-Config information element (IE). The IE SPS-Config is used to specify the SPS configuration. Table 1 shows the SPS-Config IE.

TABLE 1

```
-- ASN1START
SPS-Config ::=          SEQUENCE {
    semiPersistSchedC-RNTI      C-RNTI          OPTIONAL, -- Need OR
    sps-ConfigDL                SPS-ConfigDL    OPTIONAL, -- Need ON
    sps-ConfigUL                SPS-ConfigUL    OPTIONAL -- Need ON
}
```

TABLE 1-continued

```
SPS-ConfigDL ::= CHOICE{
    release                 NULL,
    setup                   SEQUENCE {
        semiPersistSchedIntervalDL      ENUMERATED {
                                            sf10, sf20, sf32, sf40, sf64, sf80,
                                            sf128, sf160, sf320, sf640, spare6,
                                            spare5, spare4, spare3, spare2,
                                            spare1},
        numberOfConfSPS-Processes       INTEGER (1..8),
        n1PUCCH-AN-PersistentList       N1PUCCH-AN-PersistentList,
        ...,
        [[ twoAntennaPortActivated-r10          CHOICE {
                release                             NULL,
                setup                               SEQUENCE {
                    n1PUCCH-AN-PersistentListP1-r10         N1PUCCH-AN-PersistentList
                }
            }                                                   OPTIONAL -- Need ON
        ]]
    }
}
SPS-ConfigUL ::= CHOICE {
    release                 NULL,
    setup                   SEQUENCE {
        semiPersistSchedIntervalUL      ENUMERATED {
                                            sf10, sf20, sf32, sf40, sf64, sf80,
                                            sf128, sf160, sf320, sf640, spare6,
                                            spare5, spare4, spare3, spare2,
                                            spare1},
        implicitReleaseAfter            ENUMERATED {e2, e3, e4, e8},
        p0-Persistent                   SEQUENCE {
            p0-NominalPUSCH-Persistent          INTEGER (-126..24),
            p0-UE-PUSCH-Persistent              INTEGER (-8..7)
        }                                                   OPTIONAL, -- Need OP
        twoIntervalsConfig              ENUMERATED {true}   OPTIONAL, -- Cond TDD
        ...,
        [[ p0-PersistentSubframeSet2-r12        CHOICE {
                release                             NULL,
                setup                               SEQUENCE {
                    p0-NominalPUSCH-PersistentSubframeSet2-r12      INTEGER (-126..24),
                    p0-UE-PUSCH-PersistentSubframeSet2-r12          INTEGER (-8..7)
                }
            }                                                   OPTIONAL -- Need ON
        ]]
    }
}
N1PUCCH-AN-PersistentList ::=           SEQUENCE (SIZE (1..4)) OF INTEGER (0..2047)
-- ASN1STOP
```

As described above, the SPS-Config IE may include at least one of SPS C-RNTI (semiPersistSchedC-RNTI), UL SPS interval (semiPersistSchedIntervalUL) and number of empty transmissions before implicit release (implicitReleaseAfter), whether twoIntervalsConfig is enabled or disabled for UL (twoIntervalsConfig), and DL SPS interval (semiPersistSchedIntervalDL) and number of configured HARQ processes for SPS (numberOfConfSPS-Processes), if SPS is enabled for the DL.

After a SPS DL assignment is configured, the MAC entity shall consider sequentially that the $N^{th}$ assignment occurs in the subframe for which:

(10*SFN+subframe)=[(10*SFN$_{start\ time}$+subframe$_{start\ time}$)+$N$*semiPersistSchedIntervalDL]modulo 10240, where SFN$_{start\ time}$ and subframe$_{start\ time}$ are the system frame number (SFN) and subframe, respectively, at the time the configured DL assignment were (re-) initialized.

After a SPS UL grant is configured, the MAC entity shall:
1> if twoIntervalsConfig is enabled by upper layer:
2> set the Subframe_Offset according to Table 3 below.

TABLE 3

| TDD UL/DL configuration | Position of initial Semi-Persistent grant | Subframe_Offset value (ms) |
|---|---|---|
| 0 | N/A | 0 |
| 1 | Subframes 2 and 7 | 1 |
|   | Subframes 3 and 8 | -1 |
| 2 | Subframe 2 | 5 |
|   | Subframe 7 | -5 |
| 3 | Subframes 2 and 3 | 1 |
|   | Subframe 4 | -2 |
| 4 | Subframe 2 | 1 |
|   | Subframe 3 | -1 |
| 5 | N/A | 0 |
| 6 | N/A | 0 |

1> else:
2> set Subframe_Offset to 0.
1> consider sequentially that the $N^{th}$ grant occurs in the subframe for which:

(10*SFN+subframe)=[(10*SFN$_{start\ time}$+subframe$_{start\ time}$)+$N$*semiPersistSchedIntervalUL+Subframe_Offset*($N$ modulo 2)] modulo 10240,                    2> where SFN$_{start\ time}$ and subframe$_{start\ time}$ are the SFN and subframe, respectively, at the time the configured uplink grant were (re-)initialized.

The MAC entity shall clear the configured UL grant immediately after implicitReleaseAfter number of consecutive new MAC PDUs each containing zero MAC SDUs have been provided by the multiplexing and assembly entity, on the SPS resource.

Vehicle-to-everything (V2X) communication is described. V2X communication contains the three different types, i.e. vehicle-to-vehicle (V2V) communications, vehicle-to-infrastructure (V2I) communications, and vehicle-to-pedestrian (V2P) communications. These three types of V2X can use "co-operative awareness" to provide more intelligent services for end-users. This means that transport entities, such as vehicles, road side unit (RSU), and pedestrians, can collect knowledge of their local environment (e.g. information received from other vehicles or sensor equipment in proximity) to process and share that knowledge in order to provide more intelligent services, such as cooperative collision warning or autonomous driving.

V2X service is a type of communication service that involves a transmitting or receiving UE using V2V application via 3GPP transport. Based on the other party involved in the communication, it can be further divided into V2V service, V2I service, V2P service, and vehicle-to-network (V2N) service. V2V service is a type of V2X service, where both parties of the communication are UEs using V2V application. V2I service is a type of V2X service, where one party is a UE and the other party is an RSU both using V2I application. The RSU is an entity supporting V2I service that can transmit to, and receive from a UE using V2I application. RSU is implemented in an eNB or a stationary UE. V2P service is a type of V2X service, where both parties of the communication are UEs using V2P application. V2N service is a type of V2X service, where one party is a UE and the other party is a serving entity, both using V2N applications and communicating with each other via LTE network entities.

In V2V, E-UTRAN allows such UEs that are in proximity of each other to exchange V2V-related information using E-UTRA(N) when permission, authorization and proximity criteria are fulfilled. The proximity criteria can be configured by the mobile network operator (MNO). However, UEs supporting V2V service can exchange such information when served by or not served by E-UTRAN which supports V2X service. The UE supporting V2V applications transmits application layer information (e.g. about its location, dynamics, and attributes as part of the V2V service). The V2V payload must be flexible in order to accommodate different information contents, and the information can be transmitted periodically according to a configuration provided by the MNO. V2V is predominantly broadcast-based. V2V includes the exchange of V2V-related application information between distinct UEs directly and/or, due to the limited direct communication range of V2V, the exchange of V2V-related application information between distinct UEs via infrastructure supporting V2X Service, e.g., RSU, application server, etc.

In V2I, the UE supporting V2I applications sends application layer information to RSU. RSU sends application layer information to a group of UEs or a UE supporting V2I applications.

In V2P, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P service can exchange such information even when not served by E-UTRAN which supports V2X service. The UE supporting V2P applications transmits application layer information. Such information can be broadcast by a vehicle with UE supporting V2X Service (e.g. warning to pedestrian), and/or by a pedestrian with UE supporting V2X Service (e.g. warning to vehicle). V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X service, e.g., RSU, application server, etc.

In V2X communication, messages such as common awareness messages (CAM), decentralized environmental notification messages (DENM), or basic safety messages (BSM) may be transmitted. The CAM includes information on a vehicle's type, a location, speed, a direction, etc., and may be periodically broadcasted by any vehicle. The DENM includes information on a type of a particular event and an area where the particular event has occurred, and may be broadcasted by an RSU or a vehicle. The BSM is included in the U.S. J2735 basic safety message, and have similar characteristics to those of the CAM. Through the BSM, an emergency brake warning, a front collision warning, an intersection safety support, a blind spot and line departure warning, a overtake warning, an out-of-control warning service may be provided.

Hereinafter, according to an embodiment of the present invention, a method for reallocating a PUCCH resource according to adjustment of SPS configuration is described. When performing V2X communication using the SPS, a UE is able to trigger an SPS change request from an eNB in many cases. For example, the CAM may be periodically generated in a period that is dynamically changed between 1s and 100 ms, and a generating time of the CAM may be dynamically changed. In this case, when it is necessary to change an SPS resource in response to the change of the generating time of the CAM, the UE may trigger an SPS change request from the eNB. Alternatively, when the CAM generating period is changed from 1s to 100 ms, allocating the SPS resource for is cannot match with the changed generating time of the CAM. In this case, by considering dynamic CAM generation according to time, the eNB may provide the UE with a plurality of SPS configurations which covers the dynamic change of the CAM generating period, and, when it is necessary to change the SPS resources according to the change of the CAM generating period, the UE may trigger an SPS change request from the eNB.

As such, when the SPS operation change is triggered by the UE, the eNB may reallocate periodic generation of a PUCCH resource. The PUCCH resource may be reallocated according to PUCCH resource configuration. The PUCCH resource configuration may be included as a part of the SPS configuration. Thus, when the UE triggers an SPS change request in response to change of message generating time or change of a message generating period and the eNB resumes or reactivates an SPS resource grant, the UE may change allocation of the PUCCH resource. For example, when a timing of an SPS resource of a physical uplink shared channel (PUSCH), which delivers UL data, or a physical sidelink shared channel (PSSCH), which delivers SL data, is changed due to reactivation of the SPS, a timing of the PUCCH resource may be also changed and allocated. In another example, if an SPS period on a PUSCH or a PSSCH is changed as one SPS configuration is reselected from among a plurality of SPS configurations, a period of the PUSCCH resource (e.g. a period of a scheduling request (SR) to be transmitted through the PUCCH) may be also changed to fit the reselected SPS configuration.

Alternatively, a part of the PUCCH resource configuration may be implicit. That is, periodic generation of a PUCCH resource may be reallocated by an implicit rule. For example, a timing of the PUCCH resource may be derived from a timing of an UL/SL data transmission or an activation message. For example, the PUCCH resource may be allocated x subframe before a timing of the allocated UL/SL data resource. Alternatively, the PUCCH resource may be always allocated y subframe after a timing of an activation message. In this case, the other part of the PUCCH resource configuration may be explicit. For example, a frequency resource position may be explicitly included in the PUCCH resource configuration.

If the PUCCH resource configuration is a part of the SPS configuration, a plurality of SPS configurations may include each PUCCH resource configuration, respectively. When a plurality of SPS configurations is allocated and a UE and an eNB changes to the new SPS configuration, the UE and the eNB change to a new PUCCH resource allocation corresponding to the new SPS configuration.

Figure 4:
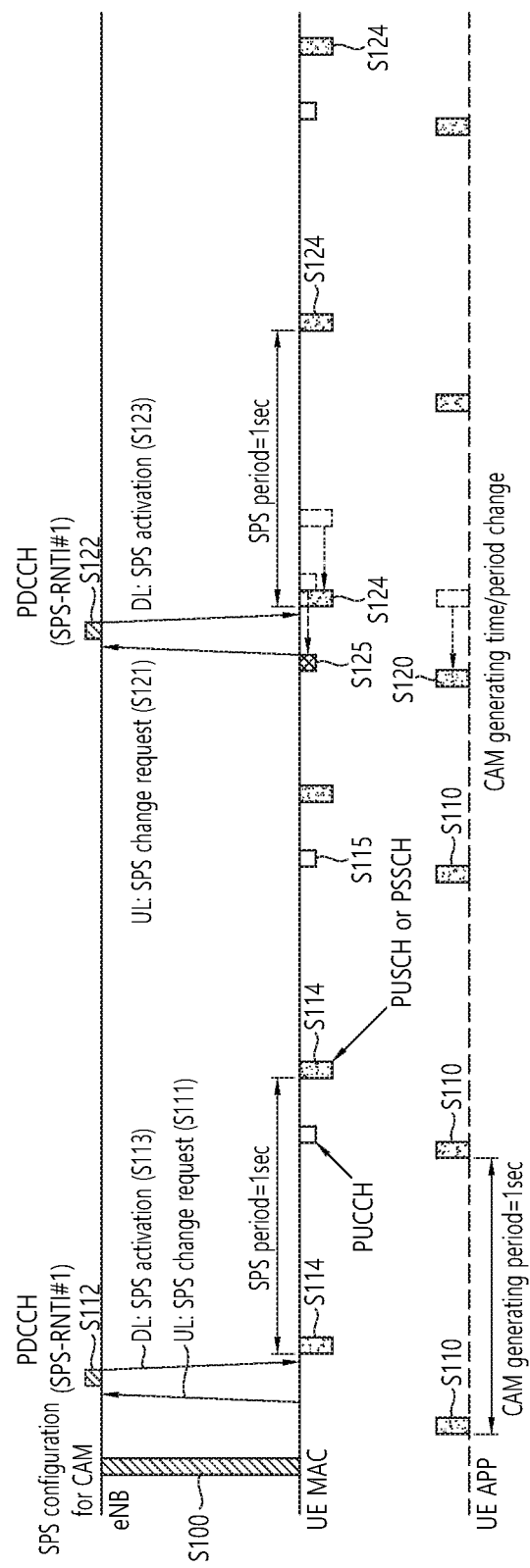
FIG. 4 shows reallocation of a PUCCH resource according to an embodiment of the present invention.

FIG. 4 shows reallocation of a PUCCH resource according to an embodiment of the present invention.

In step S100, the eNB transmits SPS configuration for a CAM to the eNB.

In step S110, a CAM is generated, a CAM generating period is assumed to be 1s. The eNB configures a PDCCH to be addressed to SPS C-RNTI #1 in step S111, and, in step S112, and transmits SPS activation through the corresponding PDCCH to the UE. Having received the SPS activation, the UE transmits the CAM through a UL (PUSCH) or an SL (PUSCH) using an SPS resource. The SPS period is assumed to be 1s.

In step S115, a PUCCH is configured. A resource for the PUCCH may be explicitly allocated from the PUCCH resource configuration. Alternatively, the resource for the PUCCH may be implicitly allocated. For example, the resource for the PUCCH may be allocated x subframe before the SPS resource. The PUCCH resource is allocated in step S115, but it is assumed that the PUCCH is not actually transmitted.

In step S120, the CAM generating time is changed. Accordingly, in step S121, the UE transmits an SPS change request to the eNB. The eNB configures a PDCCH to be addressed to SPS C-RNTI #1 in step S122, and transmits SPS reactivation to the UE through the corresponding PDCCH in step S123. Having received the SPS reactivation, the UE transmits the CAM through an UL or an SL using the SPS resource in step S124.

In step S125, a PUCCH is configured. A resource for the PUCCH may be explicitly allocated from PUCCH resource configuration. Alternatively, the resource for the PUCCH may be implicitly allocated. For example, the resource for the PUCCH may be allocated x subframe before the SPS resource of step S114. When a timing of an SPS resource of PUSCH or PSSCH is changed in response to SPS reactivation, a timing of the PUCCH resource is also changed to fit the timing of the SPS resource. In step S124, the timing of the SPS resource is advanced, and thus, the timing of the PUCCH resource is also advanced accordingly. In step S125, the PUCCH resource is allocated, and a PUCCH is transmitted using the corresponding PUCCH resource. An SPS change request of step S121 may be transmitted using the changed PUCCH resource.

Figure 5:
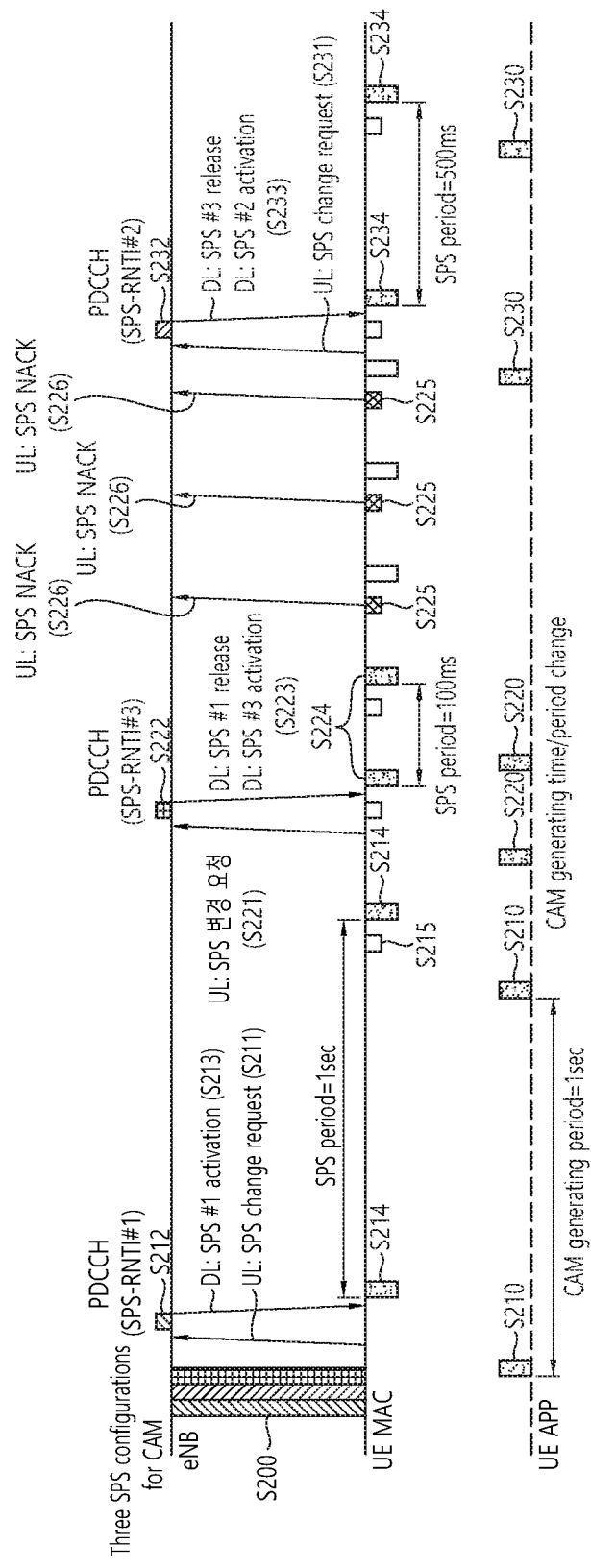
FIG. 5 shows reallocation of a PUCCH resource according to another embodiment of the present invention.

FIG. 5 shows reallocation of a PUCCH resource according to another embodiment of the present invention.

In step S200, an eNB transmits three SPS configurations for a CAM to a UE. It is assumed that a first SPS configuration supports an SPS resource of a first period, a second SPS configuration supports an SPS resource of a second period, and a third SPS configuration supports an SPS resource of a third period. In this embodiment, it is assumed to be that the first period is 1s, the second period is 500 ms, and the third period is 100 ms.

In S210, a CAM is generated. A CAM generating period is assumed to be 1s. In step S211, a UE transmits an SPS change request to an eNB. The eNB configures a PDCCH to be addressed to SPS C-RNTI #1 in step S212, and transmits SPS activation to the UE through the corresponding to PDCCH in step S213. Having received the SPS activation, the UE transmits the CAM through an UL or an SL using an SPS resource according to the first SPS configuration in step S214. According to the first SPS configuration which supports the first period, the CAM may be transmitted every 1s.

In step S215, a PUCCH is configured. A resource for the PUCCH may be explicitly allocated from a PUCCH resource configuration. A PUCCH resource may be included in the first SPS configuration. Alternatively, the resource for the PUCCH may be allocated implicitly. For example, the PUCCH resource may be allocated x subframe before from the SPS resource of step S214. In step S215, the PUCCH resource is allocated but it is assumed that a PUCCH is not actually transmitted.

In step S220, a CAM generating time/period is changed. It is assumed that the CAM generating period is shorter than 1s. In step S221, the UE transmits an SPS change request to the eNB. The eNB configures a PDCCH to be addressed to SPS C-RNTI #3 in step S222, and transmits SPS release of the first SPS configuration and SPS activation of the third SPS configuration to the UE through the corresponding PDCCH. Having received the SPS activation of the third SPS configuration, the UE transmits the CAM through an UL or an SL using an SPS resource according to the third SPS configuration in S224. According to the third SPS configuration which supports the third period, the CAM may be transmitted every 100 ms.

In step S225, a PUCCH is configured. A resource for the PUCCH may be explicitly configured from a PUCCH resource configuration. The PUCCH resource configuration may be included in the third SPS configuration. Alternatively the resource for the PUCCH may be implicitly allocated. For example, the resource for the PUCCH may be allocated x subframe before the SPS resource of step S224. When a SPS period on the PUSCH or the PSSCH is changed due to activation of the third SPS configuration, even a period of the PUCCH resource is changed to fit a period of the SPS resource. As the period of the SPS resource is reduced in step S224, even the period of the PUCCH resource is reduced accordingly. In step S225, the PUCCH resource is allocated, and the PUCCH is transmitted using the corresponding PUCCH resource.

In step S226, whenever there is not data to be transmitted in a particular SPS resource grant, the UE transmits an NACK in response to the SPS resource grant using the corresponding PUCCH resource. At this point, a plurality of NACKs may be continuously transmitted in response to different SPS resource grants. When the plurality of NACKs is continuously transmitted, the CAM generating period may be changed into a greater value in step S230. In step S231, the UE may transmit an SPS change request to the eNB. The eNB configures a PDCCH to be addressed to SPS C-RNTI #2 in step S232, and transits SPS release of the third SPS configuration and SPS activation of the second SPS configuration through the corresponding PDCCH in step S233. Having received the SPS activation of the second SPS configuration, the UE transmits the CAM through an UL or an SL using an SPS resource according to the second SPS configuration in step S234. According to the second configuration which supports the second period, the CAM may be transmitted every 500 ms.

Figure 6:
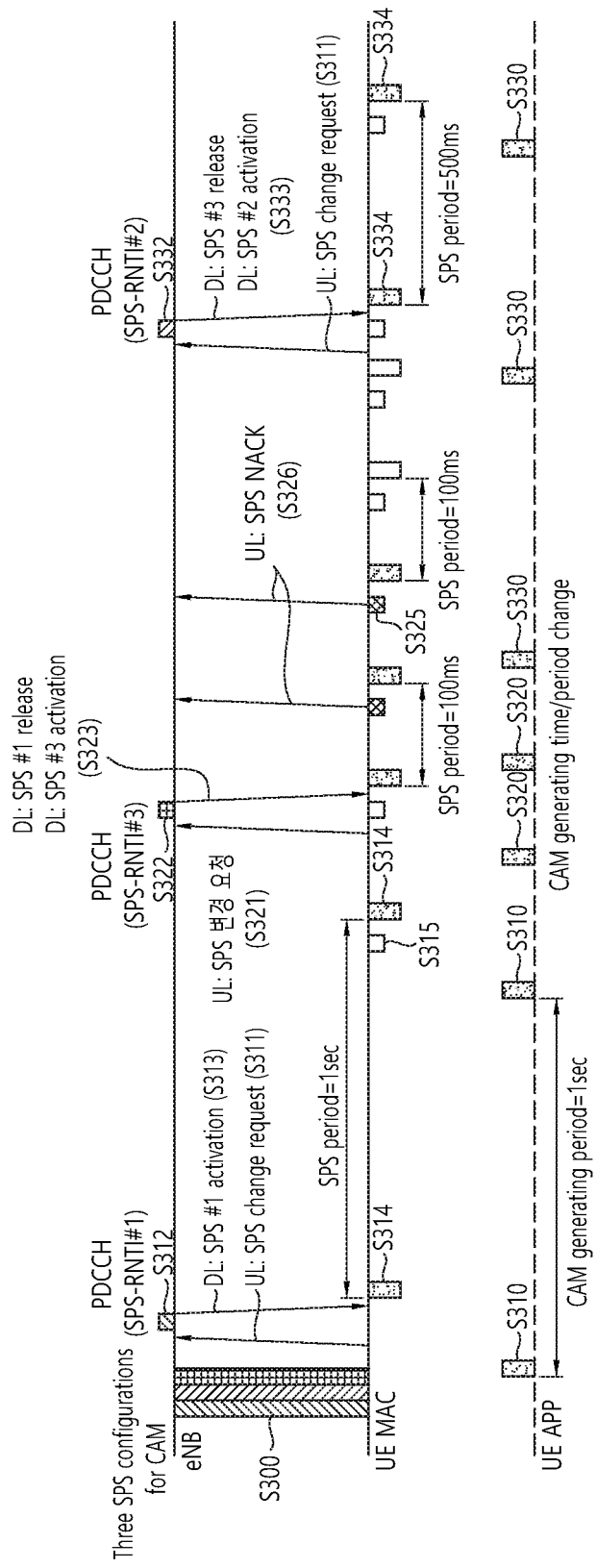
FIG. 6 shows reallocation of a PUCCH resource according to another embodiment of the present invention.

FIG. 6 shows reallocation of a PUCCH resource according to another embodiment of the present invention.

In step S300, an eNB transmits three SPS configurations for a CAM to a UE. It is assumed that a first SPS configuration supports an SPS resource of a first period, a second SPS configuration supports an SPS resource of a second period, and a third SPS configuration supports an SPS resource of a third period. In this embodiment, it is assumed that the first period is 1s, the second period is 500 ms, and the third period is 100 ms.

In step S310, a CAM is generated. A CAM generating period is assumed to be 1s. In S311, a UE transmits an SPS change request to an eNB. The eNB configures a PDCCH to be addressed to SPS C-RNTI #1 in step S312, and transmits SPS activation through the corresponding PDCCH to the UE in step S313. Having received the SPS activation, the UE transmits through a UL or an SL using an SPS resource according to the first SPS configuration in step S314. According to the first SPS configuration which supports the first period, the CAM may be transmitted every 1s.

In step S315, a PUCCH is configured. A resource for the PUCCH may be explicitly allocated from a PUCCH resource configuration. The PUCCH resource may be included in the first SPS configuration. Alternatively, the resource for the PUCCH may be implicitly allocated. For example, the resource for the PUCCH may be allocated x subframe before the SPS resource of step S314. In step S315, the PUCCH resource is allocated but it is assumed that the PUCCH is not actually transmitted.

In step S320, a CAM generating time/period is changed. It is assumed that the CAM generating period is reduced to be shorter than 1s. In step S321, a UE transmits an SPS change request to an eNB. The eNB configures a PDCCH to be addressed to SPS C-RNTI #3 in step S322, and transmits SPS release of the first SPS configuration and SPS activation of the third SPS configuration through the corresponding PDCCH in step S323. Having received the SPS activation of the third SPS configuration, the UE transmits the CAM through an UL or an SL using an SPS resource according to the third SPS configuration in step S324. According to the third SPS configuration which supports the third period, the CAM may be transmitted every 100 ms.

In step S325, a PUCCH is configured. A resource for the PUCCH may be explicitly allocated from a PUCCH resource configuration. The PUCCH resource configuration may be included in the third SPS configuration. Alternatively the resource for the PUCCH may be implicitly allocated. For example, the resource for the PUCCH may be allocated x subframe before the SPs resource of step S324. When a SPS period on a PUSCH or a PSSCH is changed due to activation of the third SPS configuration, even a period of the PUCCH resource is changed to fit the period of the SPS resource. Since the period of the SPS resource is reduced in step S324, even a period of the PUCCH resource is reduced accordingly. In step S325, a PUCCH resource is allocated, and a PUCCH is transmitted using the corresponding PUCCH resource.

In step S326, whenever data transmission is allowed in a particular SPS resource grant, the UE transmits an ACK in response to the SPS resource grant using the corresponding PUCCH resource. Whenever there is no data available in the particular SPS resource grant, the UE does not transmit the ACK. If the eNB fails to receive the ACK continuously, the CAM generating period may be changed to a greater value in step S330. In step S331, the UE transmits an SPS change request to the eNB. The eNB configures a PDCCH to be addressed to SPS C-RNTI #2 in step S332, and transmits SPS release of the third SPS configuration and SPS activation of the second SPS configuration to the UE through the corresponding PDCCH. Having received the SPS activation of the second SPS configuration, the UE transmits the CAM through an UL or an SL using a SPS resource according to the second SPS configuration in step S334. According to the second SPS configuration which supports the second period, the CAM may be transmitted every 500 ms.

Figure 7:
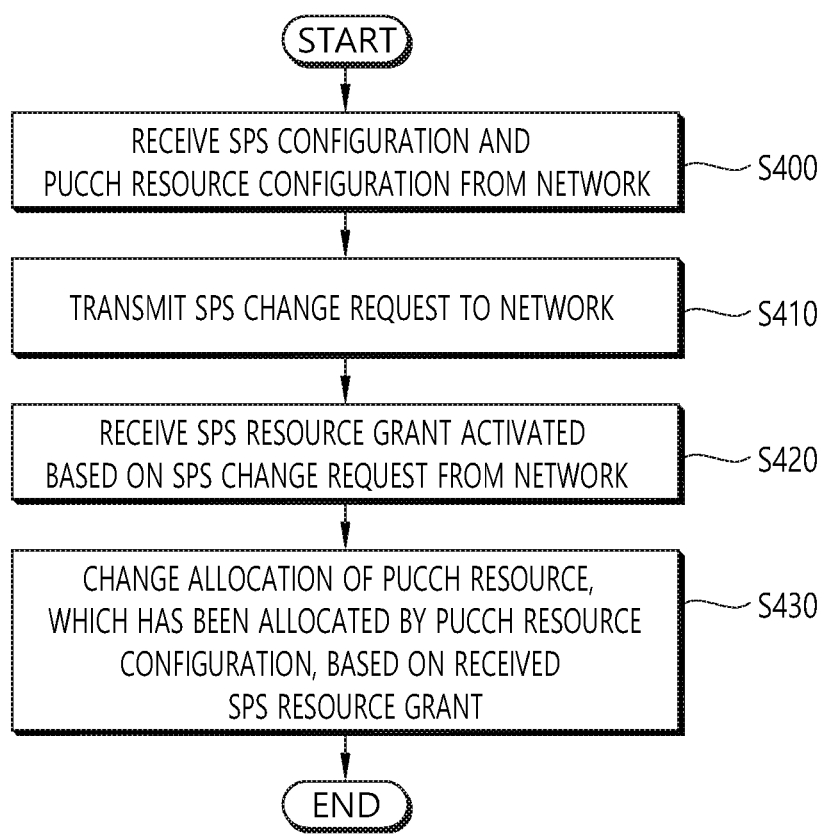
FIG. 7 shows a method of performing an SPS operation by an UE according to an embodiment of the present invention.

FIG. 7 shows a method of performing an SPS operation by an UE according to an embodiment of the present invention.

In step S400, a UE receives an SPS configuration and a PUCCH resource configuration from a network. The PUCCH resource configuration may be included in the SPS configuration. The SPS configuration may be a first SPS configuration included in a plurality of SPS configuration, the PUCCH resource configuration may be a first PUCCH resource configuration, and the plurality of SPS configurations may be included in a second SPS configuration including a second PUCCH resource configuration.

In step S410, the UE transmits an SPS change request to the network. Transmitting the SPS change request to the network may include transmitting an SR to the network.

The UE receives an SPS resource grant activated based on the SPS change request from the network in step S420, and changes allocation of a PUCCH resource which has been allocated by the PUCCH resource configuration based on the received SPS resource grant in step S430.

Changing the allocation of the PUCCH resource may include changing a timing of allocating the PUCCH resource as a timing of an uplink resource or a sidelink resource to be allocated by the SPS resource grant is changed. Alternatively, changing the allocation of the PUCCH resource may include changing a period of allocating the PUCCH resource as a period of an uplink resource or a sidelink source to be allocated by the SPS resource grant is changed. The PUCCH resource may be allocated x subframe before a timing of an uplink resource or a sidelink resource to be allocated by the SPS resource grant. Alternatively, the PUCCH resource may be allocated y subframe after a timing of receiving the SPS resource grant.

The UE may transmit a message using an uplink resource or a sidelink resource allocated by the SPS resource grant. The message may be any one of the CAM, the DENM, and the BSM used in the V2X communication.

In the above-described embodiment of the present invention, an SPS change/reactivation request, SPS activation, SPS release, SPS change in response to a change in an amount of L2 data equal to or greater than/equal to or smaller than a threshold value, an SPS period change, and an ACK/NACK in response to an SPS resource grant from the UE may be implemented by the following options.

(1) PUCCH resource (e.g. SR)

(2) Transmission of random access preamble (3) Transmission of message 3 including a C-RNTI MAC control element (CE) in a random access procedure (4) Transmission of a random MAC CE (e.g. BSR, a power headroom report (PHR), a new CE)

Figure 8:
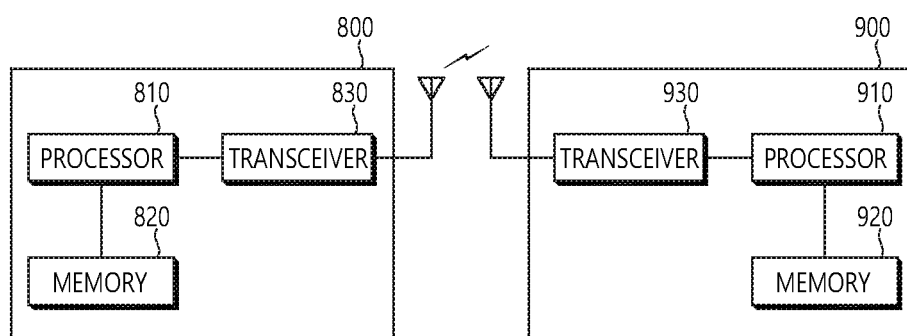
FIG. 8 shows a wireless communication system to implement an embodiment of the present invention.

(5) Transmission of uplink control information (UCI) in a PUSCH (6) MAC CE piggyback in MAC PDU transmitted in PUSCH The MAC CE in the above options may include an offset for the current SPS start time, i.e. a time difference between the current SPS resource allocation and resumed SPS resource allocation FIG. 8 shows a wireless communication system to implement an embodiment of the present invention.

An eNB 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a wireless device in a wireless communication system, the method comprising:
receiving a semi-persistent scheduling (SPS) configuration and a physical uplink control channel (PUCCH) resource configuration from a network;
performing uplink or sidelink transmission of a first periodic message based on an uplink resource or a sidelink resource, wherein the uplink resource or the sidelink resource is allocated based on the SPS configuration;
changing allocation of a PUCCH resource based on generation of a second periodic message, wherein the PUCCH resource has been allocated by the PUCCH resource configuration based on generation of the first periodic message;
transmitting, to the network, an SPS change request based on the PUCCH resource;
receiving, from the network, an SPS resource grant in response to the SPS change request;
changing allocation of the uplink resource or the sidelink resource based on the SPS resource grant; and
performing uplink or sidelink transmission of the second periodic message based on the uplink resource or the sidelink resource,
wherein the PUCCH resource is allocated a first constant number of subframes before a timing of the uplink resource or the sidelink resource to be allocated by the SPS resource grant.

2. The method of claim 1, wherein the changing the allocation of the PUCCH resource comprises changing a timing at which the PUCCH resource is allocated as a timing of the generation of the second periodic message is changed from a timing of the generation of the first periodic message.

3. The method of claim 1, wherein the changing the allocation of the PUCCH resource comprises changing a period at which the PUCCH resource is allocated as a period of the generation of the second periodic message is changed from a period of the generation of the first periodic message.

4. The method of claim 1, wherein the PUCCH resource configuration is included in the SPS configuration.

5. The method of claim 4, wherein the SPS configuration is a first SPS configuration included in a plurality of SPS configurations,
wherein the PUCCH resource configuration is a first PUCCH resource configuration, and
wherein the plurality of SPS configurations comprises a second SPS configuration including a second PUCCH resource configuration.

6. The method of claim 1, wherein the PUCCH resource is allocated a second constant number of frames after a timing of receiving the SPS resource grant.

7. The method of claim 1, wherein the transmitting the SPS change request to the network comprises transmitting a scheduling request (SR) to the network.

8. The method of claim 1, wherein at least the first periodic message or the second periodic message is any one of common awareness messages (CAM), decentralized environmental notification messages (DENM), or basic safety messages (BSM).

9. A wireless device in a wireless communication system, the wireless device comprising:
a memory;
a transceiver; and
a processor, operably coupled to the memory and the transceiver, and configured to:
control the transceiver to receive a semi-persistent scheduling (SPS) configuration and a physical uplink control channel (PUCCH) resource configuration from a network;
control the transceiver to perform uplink or sidelink transmission of a first periodic message based on an uplink resource or a sidelink resource, wherein the uplink resource or the sidelink resource is allocated based on the SPS configuration;
change allocation of a PUCCH resource based on generation of a second periodic message, wherein the PUCCH resource has been allocated by the PUCCH resource configuration based on generation of the first periodic message;

control the transceiver to transmit, to the network, an SPS change request based on the PUCCH resource;

control the transceiver to receive, from the network, an SPS resource grant in response to the SPS change request;

change allocation of the uplink resource or the sidelink resource based on the SPS resource grant; and control the transceiver to perform uplink or sidelink transmission of the second periodic message based on the uplink resource or the sidelink resource, wherein the PUCCH resource is allocated a first constant number of subframes before a timing of the uplink resource or the sidelink resource to be allocated by the SPS resource grant.

10. The UE of claim 9, wherein the the processor is further configured to change the allocation of the PUCCH resource by changing a timing at which the PUCCH resource is allocated as a timing of the generation of the second periodic message is changed from a timing of the generation of the first periodic message.

11. The UE of claim 9, wherein the the processor is further configured to change the allocation of the PUCCH resource by changing a period at which the PUCCH resource is allocated as a period of the generation of the second periodic message is changed from a period of the generation of the first periodic message.

12. The UE of claim 9, wherein the PUCCH resource configuration is included in the SPS configuration.

* * * * *